(12) United States Patent
Den Haak et al.

(10) Patent No.: US 10,837,494 B2
(45) Date of Patent: Nov. 17, 2020

(54) BEARING ASSEMBLY WITH INTEGRATED GENERATOR

(71) Applicant: Aktiebolaget SKF, Gothenburg (SE)

(72) Inventors: Nicolaas Simon Willem Den Haak, Zwijndrecht (NL); Georgo Angelis, Oss (NL); Paul van Dijk, Deurne (NL)

(73) Assignee: AKTIEBOLAGET SKF, Gothenburg (SE)

(*) Notice: Subject to any disclaimer, the term of this patent is extended or adjusted under 35 U.S.C. 154(b) by 81 days.

(21) Appl. No.: 15/825,502

(22) Filed: Nov. 29, 2017

(65) Prior Publication Data

US 2018/0149205 A1    May 31, 2018

(30) Foreign Application Priority Data

Nov. 30, 2016 (DE) .......................... 10 2016 223 778

(51) Int. Cl.
*H02K 7/14* (2006.01)
*H02K 7/18* (2006.01)
(Continued)

(52) U.S. Cl.
CPC .............. *F16C 41/00* (2013.01); *F16C 17/02* (2013.01); *F16C 19/06* (2013.01); *F16C 23/086* (2013.01);
(Continued)

(58) Field of Classification Search
CPC ........ F16C 41/00; F16C 23/086; F16C 17/02; F16C 41/004; F16C 19/06; F16C 2380/26;
(Continued)

(56) References Cited

U.S. PATENT DOCUMENTS 3,022,125 A    2/1962  Erland et al.
3,334,254 A *  8/1967  Kober .................... H02K 1/276
                                                      310/156.07
(Continued)

FOREIGN PATENT DOCUMENTS

CN    103384774 A    11/2013    .............. F16C 41/00
CN    103384774 A    11/2013
(Continued)

OTHER PUBLICATIONS

Definition of float, https://www.merriam-webster.com/dictionary/float, printed on Mar. 29, 2020.*
(Continued)

*Primary Examiner* — John K Kim
(74) *Attorney, Agent, or Firm* — J-Tek Law PLLC; Scott T. Wakeman; Mark A. Ussai

(57) ABSTRACT

A spherical roller bearing having an inner ring, an outer ring, first and second roller sets disposed therebetween, and a guide element for guiding the rollers of at least one roller set. The guide element is rotational about a bearing axis of rotation during bearing operation. The bearing further includes a generator, arranged between the first and second roller sets, which includes a magnetic rotor with alternating polarities in circumferential direction and a stator having at least one stator coil. The magnetic rotor is mounted to the guide element, while the stator is mounted to a common outer raceway of the outer ring, radially opposite from the magnetic rotor. In accordance with the invention, the stator has the form of an annular band. The at least one stator coil is formed by a flat conductor provided on a flexible printed circuit board.

15 Claims, 4 Drawing Sheets

(51) Int. Cl.
*H02K 11/20* (2016.01)
*F16C 41/00* (2006.01)
*F16C 23/08* (2006.01)
*F16C 17/02* (2006.01)
*F16C 19/06* (2006.01)

(52) U.S. Cl.
CPC ............. *F16C 41/004* (2013.01); *H02K 7/14* (2013.01); *H02K 7/1807* (2013.01); *H02K 11/20* (2016.01); *F16C 2233/00* (2013.01); *F16C 2380/26* (2013.01); *H02K 2203/03* (2013.01)

(58) Field of Classification Search
CPC ... F16C 2233/00; H02K 7/1807; H02K 11/20; H02K 7/14; H02K 2203/03
USPC ...................................... 310/67 R, 90, DIG. 6
See application file for complete search history.

(56) References Cited

U.S. PATENT DOCUMENTS

| | | | |
|---|---|---|---|
| 3,726,004 A * | 4/1973 | Holland | H01F 27/2804 29/602.1 |
| 4,557,613 A | 12/1985 | Tallian et al. | |
| 4,645,961 A * | 2/1987 | Malsky | H02K 1/278 310/156.07 |
| 4,665,331 A * | 5/1987 | Sudo | H02K 3/26 310/156.08 |
| 5,440,184 A * | 8/1995 | Samy | B61D 43/00 310/90 |
| 7,229,215 B2 | 6/2007 | Kotani | |
| 7,986,063 B2 * | 7/2011 | Nakamura | H02K 3/47 310/40 MM |
| 8,222,777 B2 | 7/2012 | Loussert et al. | |
| 8,461,737 B2 | 6/2013 | Feng et al. | |
| 9,541,129 B2 | 1/2017 | Lindén et al. | |
| 9,587,676 B2 | 3/2017 | Yasuda | |
| 10,348,145 B2 | 7/2019 | Yabe et al. | |
| 10,566,856 B2 | 2/2020 | Zhang et al. | |
| 2009/0304317 A1 | 12/2009 | Schroeder | |
| 2011/0037354 A1 * | 2/2011 | Yan | H02K 11/225 310/68 B |
| 2014/0055010 A1 | 2/2014 | Sigal et al. | |
| 2014/0086519 A1 | 3/2014 | Rink et al. | |
| 2014/0341490 A1 * | 11/2014 | Ito | F16C 33/6607 384/471 |
| 2015/0043863 A1 | 2/2015 | Beck et al. | |
| 2015/0211580 A1 | 7/2015 | Ham | |
| 2015/0364968 A1 | 12/2015 | Frank et al. | |
| 2016/0254725 A1 | 9/2016 | Angelis et al. | |
| 2017/0045089 A1 | 2/2017 | Rink | |
| 2018/0149205 A1 * | 5/2018 | Den Haak | H02K 7/1807 |

FOREIGN PATENT DOCUMENTS

| | | | |
|---|---|---|---|
| CN | 103534498 A | 1/2014 | ............. F16C 23/08 |
| CN | 103534498 A | 1/2014 | |
| CN | 104321552 A | 1/2015 | ............. F16C 41/00 |
| CN | 104321552 A | 1/2015 | |
| CN | 105143091 A | 12/2015 | ............. B66C 23/84 |
| CN | 105143091 A | 12/2015 | |
| CN | 106015367 A | 10/2016 | ............. F16C 41/00 |
| CN | 106015367 A | 10/2016 | |
| CN | 106133356 A | 11/2016 | ............. F16C 41/00 |
| CN | 106133356 A | 11/2016 | |
| CN | 106151295 A | 11/2016 | ............. F16C 41/00 |
| CN | 106151295 A | 11/2016 | |
| EP | 1292831 B1 | 10/2009 | |
| GB | 2538624 B | 2/2018 | |

OTHER PUBLICATIONS

Definition of cage, https://www.merriam-webster.com/dictionary/cage, printed on Mar. 29, 2020.*

Office Action and Search Report from the Chinese Patent Office dated Apr. 23, 2020 in related Chinese application No. 201711176863.4, and translation thereof.

* cited by examiner

BEARING ASSEMBLY WITH INTEGRATED GENERATOR

CROSS-REFERENCE

This application claims priority to German patent application no. 102016223778.0 filed on Nov. 30, 2016, the contents of which are fully incorporated herein by reference.

TECHNOLOGICAL FIELD

The invention relates to a bearing assembly comprising a double-row rolling element bearing having means for generating electrical energy from rotation of the assembly, whereby the generating means are arranged between the two rows of rolling elements.

BACKGROUND

An example of such a bearing assembly is disclosed in EP 1292831. The assembly comprises a wireless self-powered sensor unit which is electrically powered by an integrated generator. Electric power is generated via electromechanical energy conversion using permanent magnets, an armature winding and a target wheel that is mounted between adjacent bearing rings, which are rotational during bearing operation. In one example, the generator comprises a stator mounted to a non-rotational bearing ring, whereby the stator is formed by a winding that encircles a magnetic core, and whereby the target wheel is a toothed wheel. The rotating target wheel causes a change in magnetic flux in an air gap between the magnetic core and the teeth of the wheel, producing an electric current in the winding.

The arrangement of the target wheel and stator requires a relatively large amount of radial space within the bearing assembly and is not suitable for certain types of double-row bearings, such as, for example, spherical roller bearings.

There is thus room for improvement.

SUMMARY

The invention resides in a spherical roller bearing having an inner ring and an outer ring, which are relatively rotational about a bearing axis, first and second roller sets arranged between the bearing rings and a guide element for at least one of the roller sets, which guide element is rotational about the bearing axis during operation. The bearing further comprises an electromagnetic induction generator for harvesting electrical energy from rotational kinetic energy, whereby the generator comprises a magnetic rotor arranged axially between the first and second roller sets and a stator with at least one stator coil. The magnetic rotor is mounted to a radially outer side of the guide element, and comprises a magnet ring with alternating polarities along a circumference of the ring. The stator has the form of an annular band and is mounted to a radially inner surface of the bearing outer ring, facing the magnetic rotor, whereby the at least one stator coil is formed by a flat conductor provided on a flexible printed circuit board.

A spherical roller bearing has an outer ring with a common sphered outer raceway for the first and second roller sets. The guide element on which the magnetic rotor is provided can be a single cage with cage bars extending in both axial directions from a central ring portion, to create pockets for the rollers in each roller set. Alternatively, each roller set may be retained by a separate cage. The magnet rotor may then be attached to one of the cages, to allow the separate cages to rotate at different speeds. In some examples, the bearing further comprises a floating guide ring that is centered on the inner ring. In other examples, the magnetic rotor is mounted to or forms part of a floating guide ring that is centered on the cages.

The flexible printed circuit board comprising the flat conductor is an annular band that is mounted to the inner surface of the sphered outer ring at an axially central location where the bore diameter of the ring is at its largest. At the axially outer sides of the outer ring, the bore diameter is smaller. The diameter of the annular band can therefore be greater than the diameter of the opening via which it must be inserted into the ring. A flexible PCB is thus advantageous.

In some examples, a circumferential groove is machined into the inner surface of the outer ring, and the flexible PCB is mounted in the groove, so as not to protrude. This has the advantage of making it easier to assemble the bearing. In other examples, the flexible PCB is provided on the sphered inner surface of the outer ring, which has the advantage of retaining maximum strength of the outer ring.

Suitably, the magnetic rotor is a multi-pole circumferentially magnetized ring having alternating North and South pole-pairs. In one example, sintered NdFeB magnets are used. In an alternative example, a plastic bonded magnet ring is used. The number of pole-pairs depends on the size of the bearing and the electricity generation requirement. In an example, the magnetic rotor has 30 pole pairs.

In some examples, the magnetic rotor is assembled from two or more segments, which is advantageous given that also the magnetic rotor may have a diameter that is larger than the opening diameter of the outer ring. When a plastic bonded magnet is ring is used, the magnet ring may be an uninterrupted ring. The flexibility of the ring enables it to be elastically deformed during its insertion into the bearing cavity.

In a first embodiment, the stator has at least one coil that is formed by a flat conductor that extends in a circumferential direction of the bearing and has circumferential portions separated by axial portions, whereby consecutive axial portions extend in opposite axial directions. Suitably, the circumferential portions have a circumferential length that is substantially equal to the circumferential length of the poles of the magnetic rotor. The number of circumferential portions is preferably equal to the number of magnetic poles of the rotor, such that the conductor extends around the full, or substantially the full inner circumference of the bearing outer ring. Preferably, the conductor extends circumferentially through at least 270°

In one example of the first embodiment, the stator has first and second flat conductors having circumferential and axial portions, whereby the conductors are arranged one on top of the other in radial direction. The addition of a second conductor increases the amount of electrical energy that can be generated. Preferably, the axial portions of the first and second conductors overlap each other, while the circumferential portions of the first and second conductors extend at opposite axial sides of the flexible PCB. It is thought that such an arrangement will reduce eddy current generation.

In a second embodiment, the stator comprises a plurality of circumferentially arranged coils formed by spiral-shaped flat conductors. Preferably, the annular band of the stator extends around the full inner circumference or substantially the full inner circumference of the outer ring and the number of coils is equal to the number of magnetic poles. Other configurations are possible, depending on the on the power generation requirement.

A bearing according to the invention may further comprise at least one condition monitoring sensor and a wireless transmitter configured to be driven by power generated by the EM generator. The condition monitoring sensor may be a temperature sensor, a vibration sensor or other type of sensor which is useful for monitoring the condition of the bearing or the condition of a lubricant within the bearing.

The condition monitoring sensor may be mounted to a seal or end cap which encloses a radial gap between the inner and outer bearing rings. The sensor may be connected to the generator via connection wires, connected to the at least one stator coil of the generator, which are lead out of the bearing outer ring via a radial through hole and along an outer surface of the outer ring. Preferably, a groove is machined into the outer surface of the outer ring for accommodating the connection wires.

As a result of the invention, one or more condition monitoring sensors can be powered for the lifetime of the bearing.

A bearing assembly according to the invention has further advantages, which will become apparent from the following detailed description and accompanying figures.

BRIEF DESCRIPTION OF THE DRAWINGS

In the following, the invention is described with reference to the accompanying drawings, in which:

FIG. 1b is a perspective view of a section of a magnetic rotor used in the generator from the example of FIG. 1a;

FIGS. 1c, 1d respectively show a perspective view and an exploded view of a stator used in the generator from the example of FIG. 1a;

FIG. 2b is a top view of a section of a stator used in the example from FIG. 2a.

DETAILED DESCRIPTION

Figure 1A:
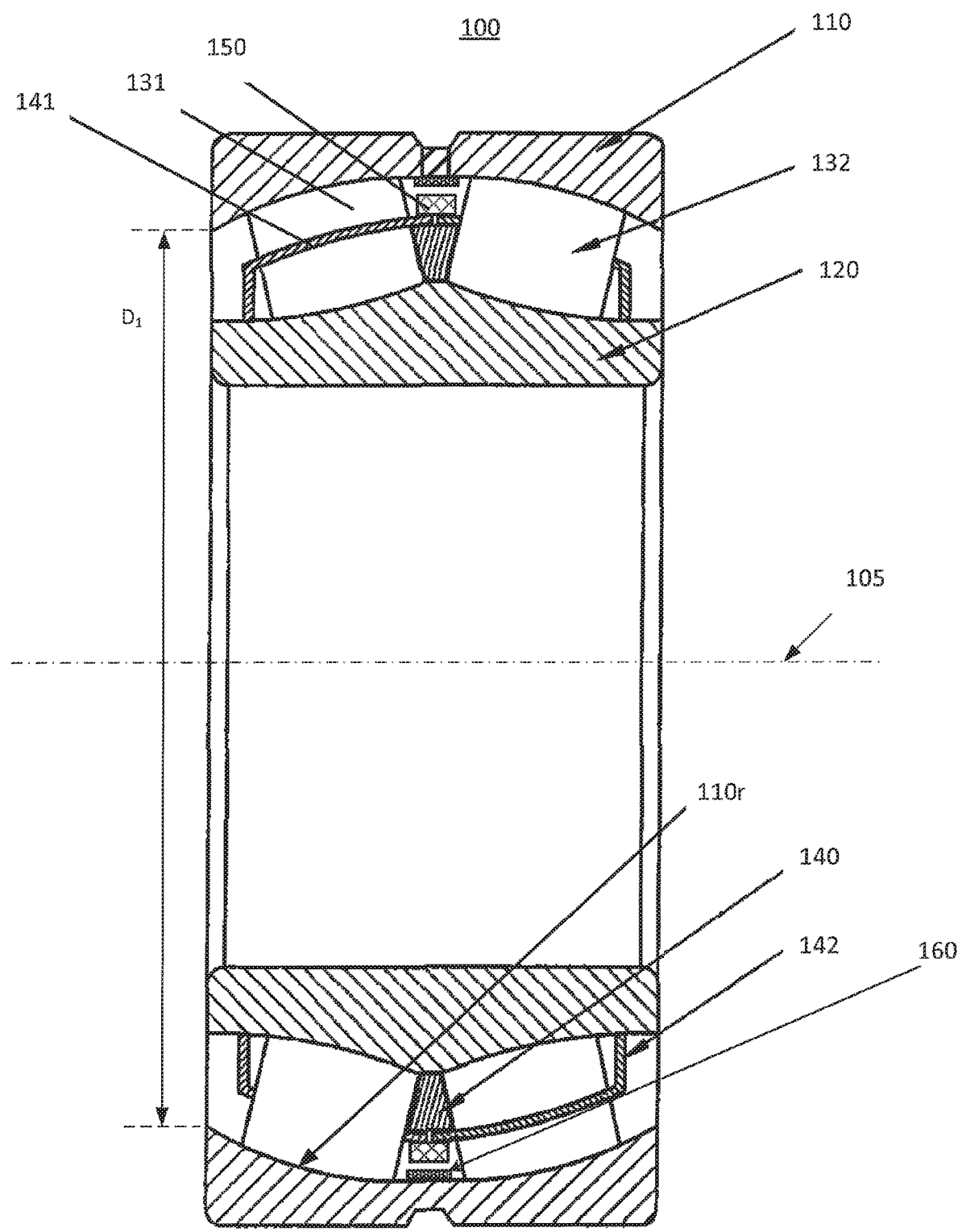
FIG. 1a is a cross-sectional view of a first example of a bearing according to the invention comprising an integrated generator for harvesting electrical energy.

An embodiment of a bearing according the invention is shown in FIG. 1a. The bearing 100 is a double-row spherical roller bearing having an outer ring 110 and an inner ring 120 which is rotational about a bearing axis 105. The outer ring 110 has a common sphered raceway $110_r$ for first and second roller sets 131, 132, while the inner ring 120 has first and second inner raceways at an angle to the bearing axis 105. The rollers of the first roller set 131 are retained by a first cage 141; the rollers of the second roller set 132 are retained by a second cage 141. Furthermore, a floating guide ring 140 is arranged between the roller sets 131, 132, to guide unloaded rollers so that they enter the bearing loaded zone in optimal position. In the depicted example, the guide ring 140 is centered on the inner ring 120.

The bearing further comprises an integrated generator for generating electrical energy from bearing rotation, via electromagnetic induction. The generated electricity may be used, for example, to power one or more condition monitoring sensors of a sensor unit, which may also include a microprocessor and an antenna for wireless transmission of sensor data. The generator comprises a magnetic rotor 150 and a stator 160 mounted to the outer raceway 110r at an axially central location between the roller sets 131, 132. In the depicted example, the magnetic rotor 150 is mounted, facing the stator 160, to an axially inner side of the first cage 141. This allows the second cage 142 and the rollers of the second roller set 132 to rotate at a different speed. In other examples, the bearing has a one-piece cage having a central portion to which the magnetic rotor is attached. In still other examples, the magnetic rotor is attached to or forms part of a guide ring that is centered on the bearing cages.

Figure 1B:
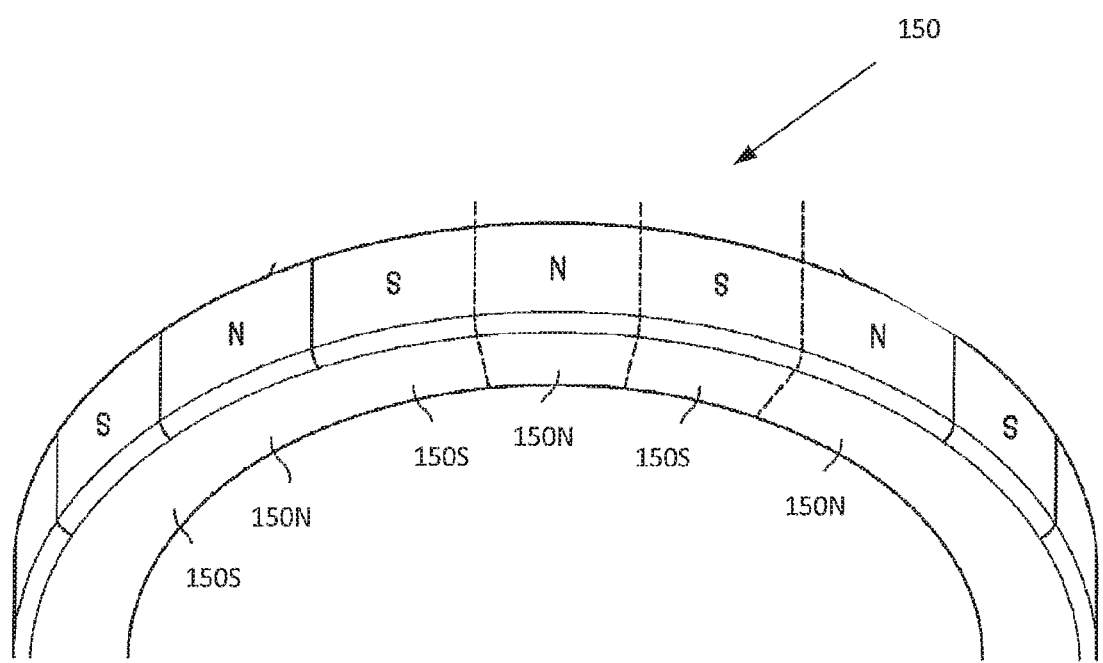

A section of a magnetic rotor suitable for use in a bearing according to the invention is shown in FIG. 1b. The magnetic rotor 150 is a magnet ring formed from e.g. sintered NdFeB magnets with alternating polarities 150N, 150S in circumferential direction. Suitably, the magnet ring 150 is a segmented magnet ring that is assembled from one or more segments, as the magnet ring 150 has a diameter that is larger than a minimum bore diameter $D_1$ of the outer ring 110 at either axial end of the outer ring, through which opening the components of the generator are inserted.

The generator is thus integrated within a cavity of the bearing, between the first and second roller sets. As a result, the bearing may be executed with standard ISO dimensions. At the same time, the generator must be capable of generating sufficient electrical energy for the application in question. This is achieved through the use of a magnetic rotor of sufficient magnetic strength and a stator with a sufficient number of coil turns. Taking account of the limited radial space within the bearing cavity, the design of the stator is of particular importance. In a bearing assembly according to the invention, the stator has one or more stator coils which are formed by a flat conductor provided on a flexible PCB.

Figure 1C:
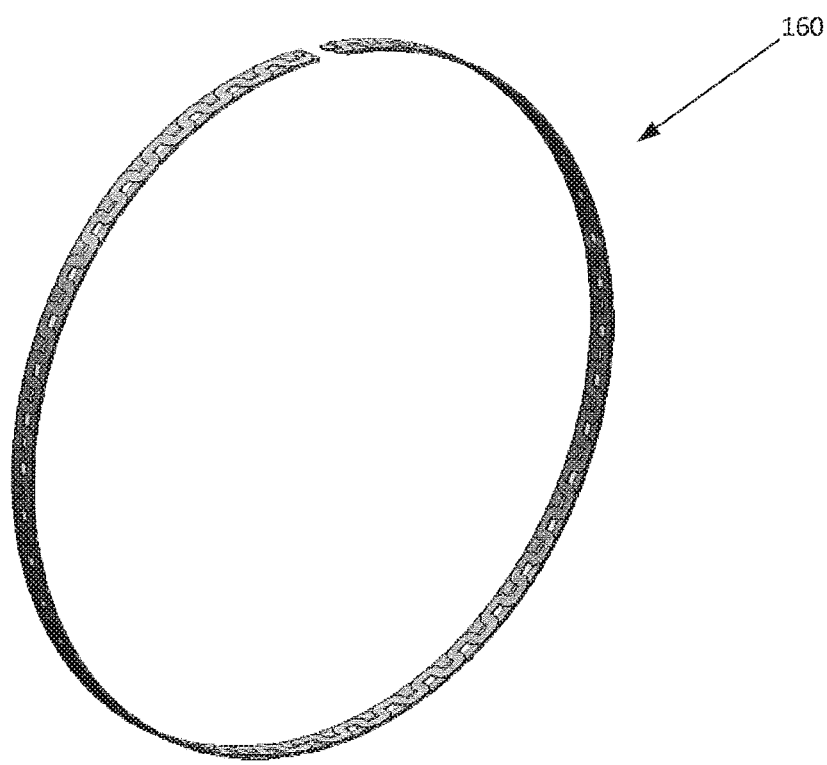
Figure 1D:
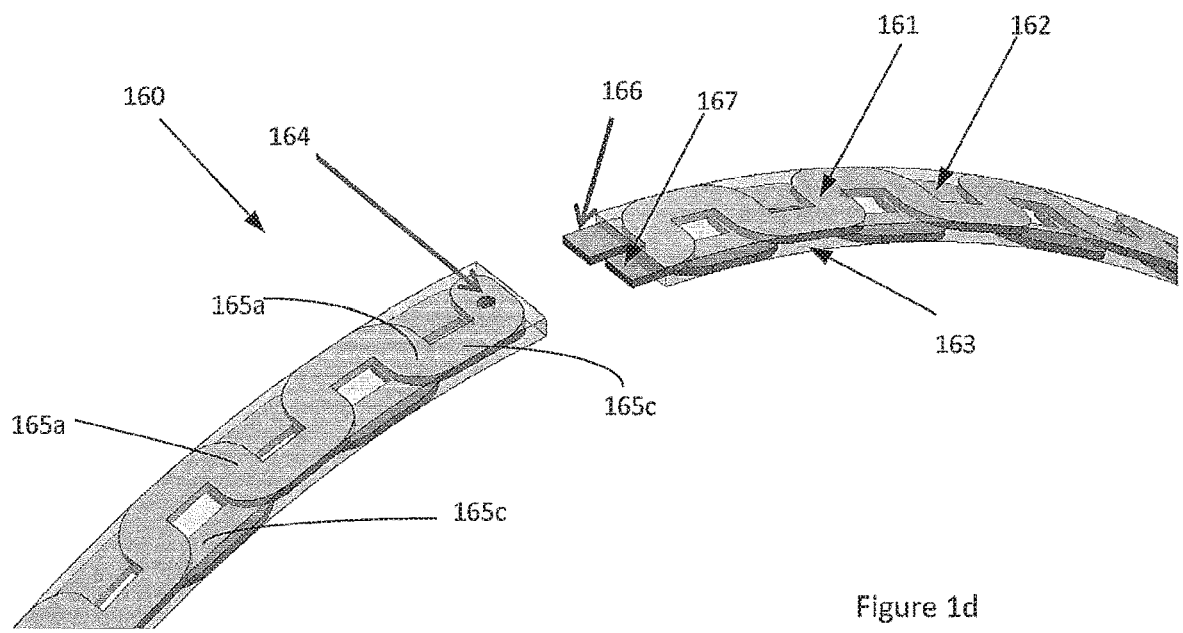

A perspective view of the stator 160 from the embodiment of FIG. 1a is shown schematically in FIG. 1c, and an exploded view of a section thereof is shown in FIG. 1d. The stator has the form of a flexible annular band and has first and second stator coils 161, 162 formed by a flat conductor that meanders in a circumferential direction. The annular band also has a diameter that is larger than the minimum bore diameter D1 and the its flexible construction allows it to be deformed while being inserted into the bore of the outer ring.

In the depicted example, the first and second flat conductors 161, 162 are etched onto radially spaced layers of a flexible PCB band 163 and are connected to each other via a layer interconnect 164. Each conductor (coil) 161, 162 has axially extending portions 165a and circumferentially extending portions 165c. Preferably, as shown in FIG. 1d, the circumferential portions of the flat conductors extend at opposite axial sides of the flexible PCB band 163, at a given circumferential location. The flat conductors 161, 162 are arranged radially opposite from the magnet ring 150. Suitably the circumferential portions 165c of the flat conductors 161, 162 have the same circumferential length as the distance between adjacent poles 150N, 150S of the magnet ring (refer FIG. 1b).

When the magnet ring 150 rotates during bearing operation, a magnetic field of alternating direction crosses the axial portions 165a of the flat conductors, generating an alternating electromotive force (EMF) which in turn produces an alternating electric current. In effect, the axially meandering portions 165a act as coil turns for increasing the generated EMF across the coil as a whole. Therefore, the stator 160 preferably extends around the full internal circumference of the outer ring 110, or substantially the full circumference, to maximise the number of coil turns that can be implemented. In the depicted example, the flexible PCB stator 160 is an open annular band, which facilitates connection of the stator to an energy consumer outside of the bearing cavity.

Suitably, terminals 166, 167 of the connected flat conductors 161, 162 are coupled to connecting wires (not shown), which are led to an outer circumference of the outer ring 110 via a radial through hole in said ring. In an embodiment, the connection wires extend to a sensor unit, which may be arranged within an annular groove in the outer circumference of the outer ring 110. Alternatively, the sensor unit may be mounted to a cap or shield that covers the annular gap between the bearing rings 110, 120. The sensor unit may include one or more of a temperature sensor, vibration sensor, acoustic emission sensor, or strain sensor, and can be powered without any need for batteries.

Figure 2A:
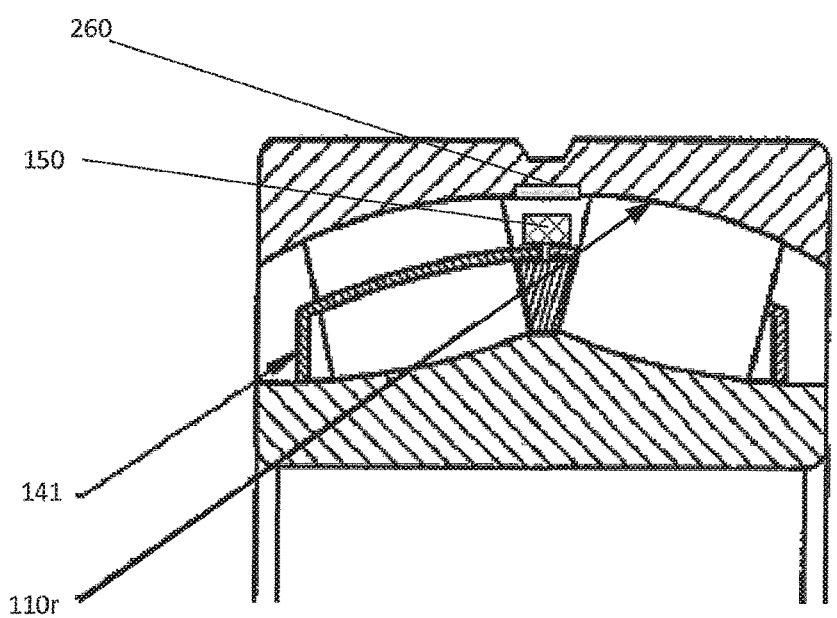
FIG. 2a is a partial cross-sectional view of a second example of a bearing according to the invention.
Figure 2B:
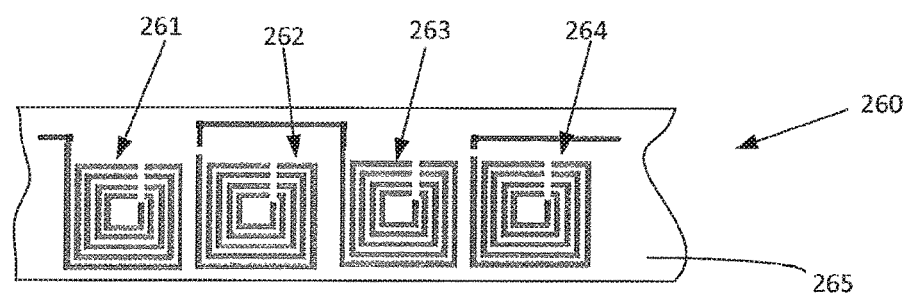
Figure 2C:
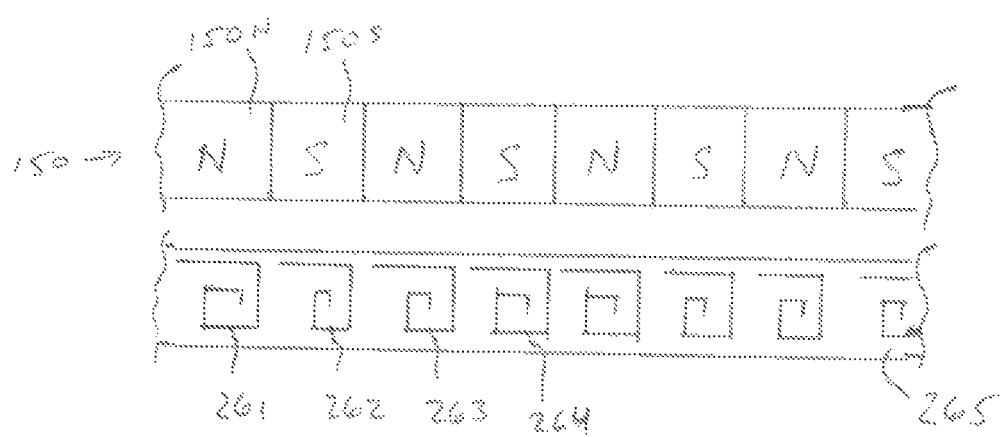
FIG. 2c is a schematic view of a portion of the rotor of FIG. 1b next to a portion of the stator of FIG. 2b.

A further example of a bearing according to the invention is shown in FIG. 2*a*. The bearing 200 comprises a magnet ring such as shown in FIG. 1*b*, which is mounted to a cage 141. The flexible PCB stator 260 again has the shape of an annular band, which extends around essentially the full inner circumference of the outer ring, but in this example is recessed in an annular groove provided in the outer raceway 110*r*. Furthermore, the stator 260 has a different design, as illustrated in FIG. 2*a*, which shows a top view a section thereof. The stator 260 comprises a plurality of circumferentially adjacent stator coils 261, 262, 263, 264 each formed by a flat conductor in the shape of a spiral, which is etched onto a flexible PCB band 265. The individual coils are electrically connected to each other and, as shown in FIG. 2*c*, have a circumferential length that is preferably equal to the circumferential pole-to-pole distance of the magnet ring 150. In this example, the stator 260 has a number of coils p equal to a number of poles q of the magnet ring 150.

A number of aspects/embodiments of the invention have been described. It is to be understood that each aspect/embodiment may be combined with any other aspect/embodiment. The invention may thus be varied within the scope of the accompanying patent claims.

What is claimed is:

1. A spherical roller bearing comprising:
   at least one inner ring;
   an outer ring;
   a first roller set and a second roller set disposed between the at least one inner ring and the outer ring;
   a guide element for guiding the rollers of the first set of rollers, the guide element comprising a bearing cage or a floating guide ring,
   a generator for harvesting electrical energy from rotation of the inner ring or the outer ring, the generator being arranged between the first roller set and the second roller set and including a magnetic rotor with alternating polarities in a circumferential direction and a stator having at least one stator coil,
   wherein,
   the magnetic rotor is mounted to the guide element,
   the stator comprises an annular band mounted to a common outer raceway of the outer ring, radially opposite from the magnetic rotor, and
   the at least one stator coil is formed by a flat conductor provided on a flexible printed circuit board.

2. The spherical roller bearing according to claim 1, wherein the stator comprises first and second flat conductors, wherein one conductor is arranged radially on top of the other conductor.

3. The spherical roller bearing according to claim 2, wherein axial portions of the first and second conductors overlap each other and wherein circumferential portions of the conductors extend at opposite axial sides of the annular band, at a given circumferential location.

4. The spherical roller bearing according to claim 1, wherein the stator comprises a plurality of circumferentially spaced coils, each being formed by a spiral-shaped flat conductor.

5. The spherical roller bearing according to claim 1, wherein the common outer raceway of the outer ring comprises an annular groove in which the stator is recessed.

6. The spherical roller bearing according to claim 1, wherein the guide element is the floating guide ring.

7. The spherical roller bearing according to claim 6, wherein the floating guide ring is located entirely between the first roller set and the second roller set.

8. A spherical roller bearing comprising:
   at least one inner ring;
   an outer ring;
   a first roller set and a second roller set disposed between the at least one inner ring and the outer ring;
   a guide element for guiding the rollers of the first set of rollers, the guide element comprising a bearing cage or a floating guide ring,
   a generator for harvesting electrical energy from rotation of the inner ring or the outer ring, the generator being arranged between the first roller set and the second roller set and including a magnetic rotor with alternating polarities in a circumferential direction and a stator having at least one stator coil,
   wherein,
   the magnetic rotor is mounted to the guide element,
   the stator comprises an annular band mounted to a common outer raceway of the outer ring, radially opposite from the magnetic rotor,
   the at least one stator coil is formed by a flat conductor provided on a flexible printed circuit board, and
   the guide element is the bearing cage.

9. A spherical roller bearing comprising:
   at least one inner ring;
   an outer ring;
   a first roller set and a second roller set disposed between the at least one inner ring and the outer ring;
   a bearing cage configured to guide the first roller set;
   a floating guide ring configured to guide the first roller set; and
   a generator for harvesting electrical energy from rotation of the inner ring or the outer ring, the generator being arranged between the first roller set and the second roller set and including a magnetic rotor with alternating polarities in a circumferential direction and a stator having at least one stator coil,
   wherein,
   the magnetic rotor is mounted on the bearing cage or on the floating guide ring,
   the stator comprises an annular band mounted to a common outer raceway of the outer ring, radially opposite from the magnetic rotor, and
   the at least one stator coil is formed by a flat conductor provided on a flexible printed circuit board.

10. The spherical roller bearing according to claim 9, wherein the magnetic rotor is mounted on the bearing cage.

11. The spherical roller bearing according to claim 9, wherein the magnetic rotor is mounted on the floating guide ring.

12. The spherical roller bearing according to claim 9, wherein the at least one stator coil comprises first and second flat conductors and wherein the first conductor is arranged radially on top of the second conductor.

13. The spherical roller bearing according to claim 12, wherein axial portions of the first and second conductors overlap each other and wherein circumferential portions of the conductors extend at opposite axial sides of the annular band, at a given circumferential location.

14. The spherical roller bearing according to claim 9, wherein the at least one stator coil comprises a plurality of circumferentially spaced coils, each being formed by a spiral-shaped flat conductor.

15. The spherical roller bearing according to claim 9, wherein the common outer raceway of the outer ring includes an annular groove in which the stator is recessed.

\* \* \* \* \*